United States Patent Office 3,408,346
Patented Oct. 29, 1968

3,408,346
1H-2,3-BENZOTHIAZIN-4(3H)-ONE 2,2-DIOXIDE
AND PROCESS FOR THEIR PRODUCTION
Gerhard Satzinger, Memingerberg, Allgau, Germany, assignor to Warner-Lambert Pharmaceutical Company, Morris Plains, N.J., a corporation of Delaware
No Drawing. Filed Dec. 3, 1965, Ser. No. 529,896
8 Claims. (Cl. 260—243)

ABSTRACT OF THE DISCLOSURE 1H-2,3-benzothiazin-4(3H)-one 2,2-dioxides of the formula:

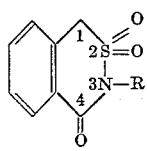

wherein R represents hydrogen, lower alkyl of 1 to 4 carbon atoms and β-dialkylaminoethyl and a process for preparing these compounds which are useful as hypoglycemic agents.

This invention relates to a novel composition of matter and more particularly it relates to 1H-2,3-benzothiazin-4(3H)-one 2,2-dioxides of the formula:

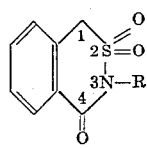

wherein R represents hydrogen; lower alkyl of 1 to 4 carbon atoms and β-dialkylaminoethyl.

This invention also includes within its scope a novel process for the production of these compounds as well as intermediates useful for their production.

The compounds of this invention exhibit significant hypoglycemic activity and are thus useful for the treatment of diabetes. In addition, they are useful as starting materials for the production of other therapeutically significant benzothiazines.

For use, these compounds may be administered as such or may be combined with a suitable carrier to give dosage forms such as tablets, suspensions, elixirs, suppositories and the like. They may also be combined with other pharmacologically active agents such as steriods, antibiotics, tranquilizers, analgesics, cardiovascular agents and the like to enhance and broaden their therapeutic spectrum.

In accordance with the process of this invention, the compounds of this invention may be prepared in accordance with the following reaction scheme:

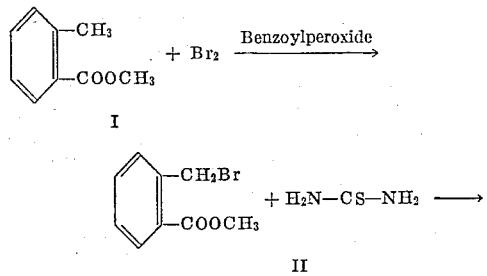

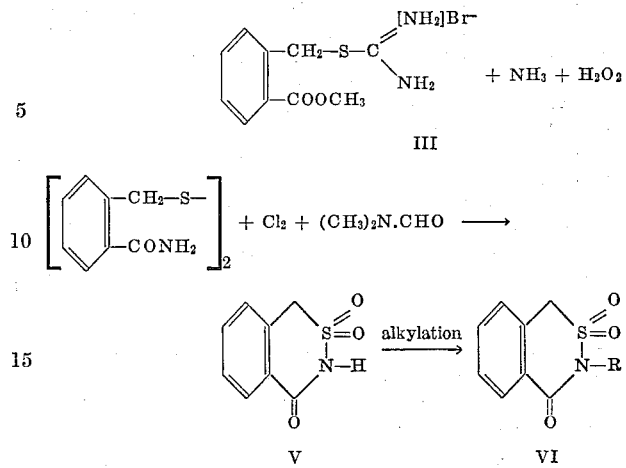

In the first step o-toluic acid methyl ester is brominated in boiling carbon tetrachloride in the presence of benzoylperoxide to form the Compound II above.

The brominated Compound II, namely, α-bromo-toluic acid methyl ester, is then treated with thiourea in a suitable solvent to form a compound corresponding to structure III above. Suitable solvents which may be employed for this step of the reaction include, for example, lower alcohols of 1 to 4 carbon atoms, a reaction temperature of 60 to 70° C. being preferred.

The step which follows comprises treatment of III with ammonia and hydrogen peroxide to form the bis-compound corresponding to structure IV, bis-(o-carbamoyl benzyl)-disulfide. This reaction is preferably carried out in a solvent such as methanol although other lower alcohols may also be employed.

Finally, the bis-compound IV is ring closed in a solvent system consisting, for example, of aqueous dimethylformamide and preferably of 2 parts of dimethylformamide to 3 parts water at a temperature of about 30 to 50° C. This novel reaction forms the desired 2,3-benzothiazine ring system V.

For a desirably high yield of the ring-closed compound, it is essential that this ring closure reaction be carried out in the solvent system described. For example, ordinary solvents such as carbon tetrachloride, chloroform, dichlorobenzol or pyridine led only to the formation of a large number of chlorinated products. A mixture of glacial acetic acid formamide, on the other hand, gives very poor yield. As a principal by-product of this ring closure reaction the following compound is also obtained.

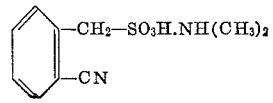

The N-alkyl derivatives of this invention VI may be prepared by reacting those compounds wherein R is hydrogen with a suitable alkylating agent. This alkylation reaction may be effected by condensing the starting material in the presence of an alkali metal carbonate such as potassium or sodium carbonate with an alkyl halide or dialkyl sulfate at a temperature of 80 to 100° C. in a solvent. Suitable alkyl halides include, for example, methyl bromide, ethyl iodide or an alkylamino halide such as β-dimethylaminoethyl chloride and the like. Suitable alkyl sulfates include, for example, dimethyl sulfate, diethyl sulfate and the like. Solvents such as dimethylsulfoxide or dimethylformamide are particularly suitable for this alkylation. The specificity of this alkylating reaction is surprising because only the nitrogen is alkylated although several positions such as 1, 3 and 4 are known to be reactive towards alkylating agents.

The compounds of this invention may be converted into their pharmaceutically acceptable nontoxic acid addition or quaternary ammonium salts. Useful acid addition salts are those formed with such acids such as maleic, fumaric, benzoic, succinic, methylsulfonic, sulfonic, citric, tartaric, salicylic, malic, cinnamic, hydrochloric, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate. These salts are also within the scope of this invention.

In order to further illustrate this invention, the following examples are given:

EXAMPLE 1.—α-BROMO-o-TOLUIC ACID METHYL ESTER

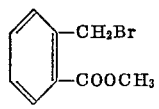

100 g. of benzoylperoxide are added to a boiling solution containing 3 kg. (20 mol) of toluic acid methyl ester in 20 l. carbon tetrachloride. This is followed by the addition of half of a solution of 3.2 kg. (20 mol) of bromine in 4 l. carbon tetrachloride. Thereafter, another 100 g. of benzoylperoxide, 4 l. carbon tetrachloride and the second half of the bromine solution are added. The mixture is refluxed for about 15 minutes and the solvent is removed by distillation. The residue consists according to quantitative determinations of 90–95% α-bromo-o-toluic acid methyl ester. It is directly used as such for further processing.

EXAMPLE 2.—2-(o-CARBOMETHOXYBENZYL)-2-THIOPSEUDOUREA HYDROBROMIDE

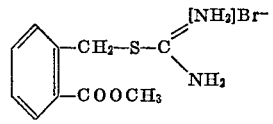

2.5 kg. (10 mol+10%) of α-bromo-toluic acid methyl ester obtained as described in the above example are dissolved in 5 liters of methanol, and 0.76 kg. (10 mol) of thiourea are added while stirring. The mixture is heated for 8 hours under reflux; thereafter the methanol is distilled and the residue is suspended with acetonitrile. One removal of solvent 2.49 kg. (81% of yield) of 2-(o-carbomethoxybenzyl)-2-thiopseudourea hydrobromide in the form of a colorless crystalline mass (melting point 160–164° C.) are obtained. An analytically pure product is obtained by recrystallization from acetonitrile. Melting point 167–168° C.

Analysis for $C_{10}H_{13}BrN_2O_2S$: (M.W. 305.2).—Calcd.: C, 39.36; H, 4.30; Br, 26.18; N, 9.18; S, 10.50. Found: C, 39.77; H, 4.07; Br, 25.81; N, 9.43; S, 10.37.

EXAMPLE 3.—α,α'-DITHIODI(o-TOLUAMIDE)

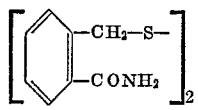

A solution of 1.53 kg. (5 mol) of 2-(o-carbomethoxybenzyl)-2-thiopseudourea hydrobromide dissolved in 7 liters of methanol is saturated with $NH_3$ gas. While stirring 150 ml. of 30% $H_2O_2$ are dropped into the solution after which the mixture is allowed to stand overnight. The following day, it is again saturated with $NH_3$ and the same quantity of 30% $H_2O_2$ is dropped in. After 24 hours the liquid is sucked off from the sediment, and the latter is washed with methanol and then with ether. 0.54 kg. (66% of yield) of α,α'-dithiodi-(o-toluamide) in the form of a colorless product, which melts at 233° C. after recrystallization from methanol plus a small quantity of dimethylformamide are obtained.

Analysis for $C_{16}H_{16}N_2O_2S$: (M.W. 332.4).—Calcd.: C, 57.88; H, 4.86; N, 8.44; S, 19.32. Found: C, 57.58; H, 4.81; N, 8.53; S, 19.06.

EXAMPLE 4.—1H-2,3-BENZOTHIAZIN-4-(3H)-ONE 2,2-DIOXIDE

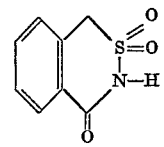

Through a suspension of 332.4 g. (1 mol) of α,α'-dithiodi-(1-toluamide) in 4.4 liters of 40% dimethylformamide a moderate stream of $Cl_2$ is passed for 5 hours at 30° C. After this period the temperature of the clear solution is 50° C. By bubbling air through the solution, it is freed from excessive $Cl_2$ and is subsequently allowed to stand overnight at 0° C. 1H-2,3-benzothiazin-4(3H)-one 2,2-dioxide is obtained as a colorless, crystalline sediment which is analytically pure, M.P. 220° C., yield 131 g. (33% of theory). Further quantities of this product can be harvested from the mother liquor by concentrating to give a second crop.

Analysis for $C_8H_7NO_3S$: (M.W. 197.2).—Calcd.: C, 48.72; H, 3.58; N, 7.10; S, 16.26. Found: C, 48.62; H, 3.81; N, 7.46; S, 16.49.

EXAMPLE 5.—3-METHYL-1H-2,3-BENZOTHIAZIN-4(3H)-ONE 2,2-DIOXIDE 19.7 g. (0.1 mol) of 1H-2,3-benzothiazin-4(3H)-one 2,2-dioxide are dissolved in 170 ml. of dimethylformamide, mixed with 16 g. (0.11 mol) of $K_2CO_3$ and 12.6 g. (0.1 mol) of dimethylsulfate and heated at 100° C. for 14 hours. When the solution is cooled down, it is poured into 1 liter of water, and the sediment is sucked off. The latter is recrystallized from ethanol to yield 14 g. (66% of theory) of 3-methyl-1H-2,3-benzothiazin-4(3H)-one 2,2-dioxide melting point 145° C.

Analysis for $C_9H_9NO_3S$: (M.W. 211.2).—Calcd.: C, 51.19; H, 4.30; N, 6.64; S, 15.18. Found: C, 51.36; H, 4.33; N, 6.85; S, 15.06.

EXAMPLE 6.—3-ETHYL-1H-2,3-BENZOTHIAZIN-4-(3H)-ONE 2,2-DIOXIDE 19.7 g. (0.1 mol) of 1H-2,3-benzothiazin-4-(3H)-one 2,2-dioxide are mixed with diethyl sulfate in the presence of $K_2CO_3$, as described in Example 5. The product formed upon reaction is recrystallized from ethanol to give 14.5 g. (65% of theory) of 3-ethyl-1H-2,3-benzothiazin-4-(3H)-one 2,2-dioxide melting point 160° C.

Analysis for $C_{10}H_{11}NO_3S$: (M.W. 225.3).—Calcd.: C, 53.32; H, 4.93; N, 6.22; S, 14.23. Found: C, 53.14; H, 4.99; N, 6.36; S, 14.08.

EXAMPLE 7.—3-n-BUTYL-1H-2,3-BENZOTHIAZIN-4-(3H)-ONE 2,2-DIOXIDE 19.7 g. (0.1 mol) of 1H-2,3-benzothiazin-4(3H)-one 2,2-dioxide are added to n-butyl iodide in the manner as described in Example 5. The product formed is recrystallized from isopropanol to yield 12 g. (48% of theory) of 3 - n-butyl-1H-2,3-benzothiazin-4(3H)-one 2,2-dioxide melting point 85–86° C.

Analysis for $C_{12}H_{15}NO_3S$: (M.W. 253.3).—Calcd.: C, 56.89; H, 5.97; N, 5.53; S, 12.66 Found: C, 57.10; H, 6.19; N, 5.72; S, 12.71.

EXAMPLE 8.—3-(β-DIMETHYLAMINOETHYL)-1H-2,3-BENZOTHIAZIN-4(3H-ONE 2,2-DIOXIDE HCl 19.7 g. (0.1 mol) of 1H-2,3-benzothiazin-4(3H)-one 2,2-dioxide are dissolved in 150 ml. of dimethylformamide, 16 g. (0.11 mol) of $K_2CO_3$ and 14.3 g. (0.1 mol) of β-dimethylaminoethyl chloride. A small quantity of hydrogen chloride is added, and the mixture is stirred and heated for 6 hours at 100° C. After cooling the solution is poured into 1 liter of water and is separated from the precipitated oil after standing at 0° C. The base is dissolved in ice cold, diluted hydrochloride and the crystalline 3-(β-dimethylaminoethyl) - 1H-2,3-benzothiazin-4(3H)-one 2,2-dioxide hydrochloride is separated after the addition of ethanol. The product after being recrystallized from ethanol, melts at 250° C. (decomp.). Yield 15.2 g. (50% of theory).

Analysis for $C_{12}H_{17}ClN_2O_3S$: (M.W. 304.8).—Calcd.: C, 47.28; H, 5.62; N, 9.19; Cl, 11.64; S, 10.52. Found: C, 47.48; H, 5.70; N, 9.24; Cl, 11.85; S, 10.17.

EXAMPLE 9. — 3-(β-DIETHYLAMINOETHYL)-1H-2,3 - BENZOTHIAZIN - 4(3H) - ONE 2,2 - DIOXIDE HYDROCHLORIDE

β-diethylaminoethyl chloride hydrochloride is added to 19.7 g. (0.1 mol) of 1H-2,3-benzothiazin-4(3H)-one 2,2-dioxide as described in Example 8. In this case, however, the base 3 - (β-diethylaminoethyl)-1H-2,3-benzothiazin-4 (3H)-one 7,7-dioxide is obtained in crystalline form. Yield 21 g. (70% of theory), fusion point 70° C. It is converted into the hydrochloride salt as described in Example 5. Yield 16 g. Melting point 218° C. (after recrystallization from ethanol).

Analysis for $C_{14}H_{21}ClN_2O_3S$: (M.W. 332.9).—Calcd.: C, 50.51; H, 6.36; N, 8.42; Cl, 10.66; S, 9.63. Found: C, 50.42; H, 6.29; N, 8.65; Cl, 10.46; S, 9.66.

EXAMPLE 10

In order to demonstrate the hypoglycemic effects of the compounds of this invention, the following procedure was carried out. Male and female dogs weighing from 4 to 10 kg. are employed. The blood sugar level of each dog before treatment is determined. A compound of the formula:

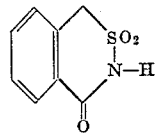

is suspended in 1% gum tragacanth solution and fed orally by a stomach tube to one of the dogs. Two hours later the blood sugar level is again determined. As a control, dogs were also given tragacanth solution and the blood sugar was also determined in an analogous fashion. As a positive control, certain dogs were also given tolbutamide. The following table demonstrates the effectiveness of the compounds of this invention to reduce blood sugar.

TABLE

| Substance | Mg./kg. | LD₅₀ mg./kg. (mouse) | Variation of the blood sugar level in percent |
|---|---|---|---|
| Mucilage of tragacanth | | | −8 |
| 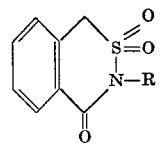 | 50 orally | 1,000 subcutaneously | −21 |
| Tolbutamide | 100 orally | 2,000 orally | −41 |
| Mucilage of tragacanth | | | +30 |
| 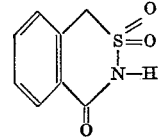 | 150 orally | 3,000 orally | −28 |
| Tolbutamide | 100 orally | 2,000 orally | −56 |

The acute toxicity of each compound is also included for comparative purposes and this value is determined by feeding graded doses of these compounds to adult, female mice, the $LD_{50}$ value, a commonly referred to pharmacological term, being calculated as the dose at which 50% of the test mice survive after treatment.

It is to be understood that the foregoing detailed description is given merely by way of illustration and that many variations may be made therein without departing from the spirit of my invention.

Having described my invention, what I desire to secure by Letters Patent is:

1. A compound selected from the group consisting of a free base of the formula:

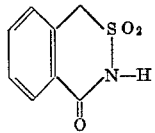

wherein R is a member of the group consisting of hydrogen, lower alkyl and β-diloweralkyl amino ethyl and its acid addition salts.

2. 1H-2,3-benzothiazin-4(3H)-one-2,2-dioxide.
3. 3 - methyl - 1H-2,3-benzothiazin-4(3H)-one-2,2-dioxide.
4. 3 - ethyl - 1H - 2,3-benzothiazin-4(3H)-one-2,2-dioxide.
5. 3 - n - butyl - 1H-2,3-benzothiazin-4(3H)-one-2,2-dioxide.
6. 3 - (β - dimethylaminoethyl) - 1H-2,3-benzothiazin-4(3)-one-2,2-dioxide hydrochloride.
7. 3-(β-diethylaminoethyl)-1H-2,3-benzothiazin-4(3H)-one-2,2-dioxide hydrochloride.
8. Process for the production of a compound of the formula:

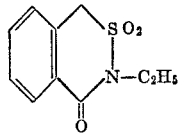

which comprises contacting a compound of the formula:
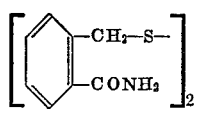
with chlorine in solvent system consisting of aqueous dimethylformamide.
References Cited
UNITED STATES PATENTS
3,152,138   10/1964   Aichenegg et al. _____ 260—243
3,284,450   11/1966   Kraaijeveld _____ 260—243
HENRY R. JILES, *Primary Examiner.*
JOHN D. RANDOLPH, *Examiner.*
J. M. FORD, *Assistant Examiner.*